United States Patent
Morris et al.

(10) Patent No.: US 9,027,678 B1
(45) Date of Patent: May 12, 2015

(54) OMNI-DIRECTIONAL REMOTE-CONTROLLED MOBILITY APPARATUS

(71) Applicants: Merry Lynn Morris, Tampa, FL (US); Mark Rumsey, Murrieta, GA (US); Thomas Messerschmidt, Riverside, CA (US); Tim John Lewis, Garden Grove, CA (US); Neil Edmonston, Pensacola, FL (US)

(72) Inventors: Merry Lynn Morris, Tampa, FL (US); Mark Rumsey, Murrieta, GA (US); Thomas Messerschmidt, Riverside, CA (US); Tim John Lewis, Garden Grove, CA (US); Neil Edmonston, Pensacola, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/213,011

(22) Filed: Mar. 14, 2014

Related U.S. Application Data

(60) Provisional application No. 61/781,382, filed on Mar. 14, 2013.

(51) Int. Cl.
*B62D 61/10* (2006.01)
*A61G 5/04* (2013.01)
*B60B 19/00* (2006.01)
(Continued)

(52) U.S. Cl.
CPC .......... *A61G 5/04* (2013.01); *A61G 2005/1051* (2013.01); *B60B 19/003* (2013.01); *G05D 1/0016* (2013.01)

(58) Field of Classification Search
USPC ..................... 180/21, 22, 23, 24.08
See application file for complete search history.

(56) References Cited

U.S. PATENT DOCUMENTS

| | | | |
|---|---|---|---|
| 7,318,628 | B2 | 1/2008 | Guile |
| 7,748,490 | B2 | 7/2010 | Hornick et al. |
| 8,210,556 | B2 | 7/2012 | Zhou et al. |

(Continued)

FOREIGN PATENT DOCUMENTS

| | | |
|---|---|---|
| CA | 2422883 C | 10/2008 |
| CA | 2782100 A1 | 4/2011 |

(Continued)

OTHER PUBLICATIONS

Honda announces New UNI-CUB Personal Mobility Device Designed for Harmony with People. Hone Worldwide. Date Released May 15, 2012. Date Accessed May 19, 2014. http://world.honda.com/news/2012/c120515UNI-CUB-Personal-Mobility/index.html.

(Continued)

*Primary Examiner* — Faye M. Fleming
(74) *Attorney, Agent, or Firm* — Nilay J. Choksi; Smith & Hopen, P.A.

(57) ABSTRACT

An omnidirectional mobility apparatus. The current invention is an omnidirectional, remote-controlled mobility apparatus, similar to a wheelchair, which allows the transport of an individual or object(s). The device includes a cubic-shaped base with wheel wells on each vertical side of said base. Within each wheel well is a wheel set, such that the front and rear wheel sets face each other and the left and right wheel sets face each other. The circumference of each wheel set includes a plurality of transverse-facing, smaller wheels disposed incrementally within each wheel set along the circumference of each wheel set, such that a portion of the smaller wheels protrude outside the circumference of each wheel set. This allows the mobility apparatus to propel in any direction. Also included in the device are an adjustable, interchangeable footrest and chair assembly.

16 Claims, 8 Drawing Sheets

(51) Int. Cl.
*G05D 1/00* (2006.01)
*A61G 5/10* (2006.01)

(56) References Cited

U.S. PATENT DOCUMENTS

| | | | |
|---|---|---|---|
| D676,214 S | | 2/2013 | McKinnon et al. |
| 8,583,302 B2 | * | 11/2013 | Akimoto et al. ............ 701/22 |
| 2002/0057010 A1 | * | 5/2002 | Harris ..................... 301/5.23 |
| 2003/0066693 A1 | * | 4/2003 | Marrero ..................... 180/21 |
| 2007/0096541 A1 | | 5/2007 | Guile |
| 2008/0202837 A1 | | 8/2008 | Macedo Ribeiro et al. |
| 2012/0019048 A1 | | 1/2012 | Mckinnon et al. |
| 2013/0012369 A1 | | 1/2013 | Prest |

FOREIGN PATENT DOCUMENTS

| | | |
|---|---|---|
| CA | 2534861 C | 6/2011 |
| EP | 2689811 A1 | 1/2014 |
| EP | 2490903 B1 | 8/2014 |
| WO | 2011047443 A1 | 4/2011 |

OTHER PUBLICATIONS

6" Plastic Omni Wheel w 3/8" Ball Bearings (am-0094). AndyMark. Date Accessed Oct. 28, 2014. http://www.andymark.com/product-p/am-0094.htm.

Translation of EP 2490903 B1 (filing date: Oct. 25, 2010) with a Publication date of Aug. 27, 2014; Application: Rotacaster Wheel Ltd.

Rotacaster Multi-directional Wheel. Kornylak Corporation. Date Accessed Oct. 28, 2014. http://www.kornylak.com/wheels/rotacaster.html.

* cited by examiner

OMNI-DIRECTIONAL REMOTE-CONTROLLED MOBILITY APPARATUS

CROSS-REFERENCE TO RELATED APPLICATIONS

This nonprovisional application is a continuation of and claims priority to provisional application No. 61/781,382, entitled "Omni-Directional Remote-Controlled Mobility apparatus", filed Mar. 14, 2013 by the same inventor, the entirety of which is incorporated herein by reference.

BACKGROUND OF THE INVENTION

1. Field of the Invention

This invention relates, generally, to mobility apparatuses, namely wheelchair assemblies. More particularly, it relates to an automated wheelchair assembly capable of easily rotating in all directions.

2. Description of the Prior Art

Automated or power wheelchair assemblies are known in the art. Other wheelchair assemblies must be propelled manually and offer only basic features and functions. However, wheelchairs are indispensable to individuals who are physically or mentally disabled. Thus, with increasing healthcare costs, wheelchairs should be as effective and efficient as possible. However, the conventional art does not provide such benefits.

Additionally, typical wheelchairs provide a single chair within which an individual sits. Sitting in this manner through all daily activities may injure the individual (e.g., bedsores, body deformation, etc.).

Furthermore, conventional wheelchairs are difficult to maneuver, have wide turning radiuses, and are inefficient with regards to movement and direction of movement. Wheelchairs are often strenuous or inefficient to propel and are exhausting to use over long distance and long periods of time, even considering power wheelchairs. Wheelchairs taught in the prior art have limited directionality, static height, and limited control options.

Conventional power wheelchairs, in particular, typically include two drives with drive wheels disposed along a horizontal axis of the assembly, said horizontal axis being perpendicular to the direction of forward motion of the assembly. The wheelchairs also typically have a support frame that not only is coupled to the drives and drive wheels but further includes idler wheels or caster wheels. Location of drive wheels, whether front, rear, or center, determine location and need for idler/caster wheels, the need of which creates an additional cost of material and manufacture. An example can be seen in U.S. Pat. No. 8,210,556.

Other conventional wheelchair or mobility assemblies include the Honda Motor Co., Ltd. UNI-CUB personal mobility apparatus, U.S. Patent Pub. No. 2008/0202837, and U.S. Pat. No. 7,748,490. However, these prior art devices are not conducive for a disabled person to be transported or conduct activities while having their hands free to multitask. All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Accordingly, what is needed is an omnidirectional, easy-to-use mobility apparatus (e.g., wheelchair assembly) that allows an individual or object to be transported comfortably, effectively, and efficiently. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an omni-directional mobility apparatus is now met by a new, useful, and nonobvious invention.

In an embodiment, the current invention is an omnidirectional mobility apparatus. The mobility apparatus includes a base having a front side, a rear side, a left side, right side, and a top surface that is coupled to at least one of the sides. The front and rear sides are parallel to one another; the left and right sides are parallel to one another; and the front and rear sides are perpendicular to the left and right sides. The front side includes a central axle positioned therewith or therealong with a plurality of wheels extending radially therefrom. The diameters of the wheels are disposed perpendicular to the plane of the front side in particular positions. The rear side includes a central axle positioned therewith or therealong with a plurality of wheels extending radially therefrom. The diameters of the wheels are disposed perpendicular to the plane of the rear side in particular positions. The left side includes a central axle positioned therewith or therealong with a plurality of wheels extending radially therefrom. The diameters of the wheels are disposed perpendicular to the plane of the left side in particular positions. The right side includes a central axle positioned therewith or therealong with a plurality of wheels extending radially therefrom. The diameters of the wheels are disposed perpendicular to the plane of the right side in particular positions. In this way, the front and rear wheels are parallel to one another, the left and right wheels are parallel to one another; and the front and rear wheels are perpendicular to the left and right wheels.

Each front wheel may point in a substantially fixed direction perpendicular to the plane of the front side. Each rear wheel can also point perpendicular to the plane of the rear side and parallel to the front wheels. Similarly, each left wheel may point in a substantially fixed direction perpendicular to the plane of the left side and perpendicular to the diameters of the front and rear wheels. Each right wheel can also point perpendicular to the plane of the right side and parallel to the left wheels.

Optionally, a footrest can extend from the front side.

Optionally, a chair can be coupled to and positioned in overlying relation to the top surface of the base. In a further embodiment, the chair can be rotatable about its vertical axis above the base.

The base may have a generally cubic shape, though it may be appreciated that other base shapes can be utilized with the current invention.

Each of the wheels can be passively mounted, such that each wheel is non-motorized and freely rotatable in their respective directions of travel.

Each axle can include a driving wheel with the other wheels mounted along the circumference of the driving wheel. In a further embodiment, each driving wheel can be incrementally notched or recessed along its circumference to receive the other wheels positioned therearound.

The mobility apparatus may further include a series of step mechanisms and foot wells along one or more of the sides of the base in order to facilitate a user's entry onto and exit from the mobility apparatus.

The mobility apparatus may further include complementary sets of wheels respectively adjacent and parallel to the front wheels, rear wheels, left wheels, and right wheels. Typically, the wheels have the same or similar diameters as the original wheels. The complementary sets of wheels extend radially from the respective axles within or along the respective sides of the base. Each of the wheels has a diameter that is perpendicular to the plane of the respective side in or along which it is positioned. In a further embodiment, the complementary wheels can be offset from the original wheels so that they do not contact each other when the mobility apparatus is in use. In another embodiment, the original wheels and complementary wheels can each point in a substantially fixed direction perpendicular to their respective side of the base. In another embodiment, the respective axle include driving wheels, which have the smaller wheels positioned therearound, and complementary driving wheels, which have the complementary smaller wheels positioned therearound. In this case, the driving wheels and complementary driving wheels can be incrementally notched or recessed to receive the smaller wheels therearound.

In a separate embodiment, the current invention is an improved wheel set. The wheel set includes a driving wheel that has a predefined diameter and is rotatably mounted on a wheel axle. A plurality of driven wheels, each having a predefined diameter that is smaller than the diameter of the driving wheel, are incrementally mounted along the circumference of the driving wheel. Each driven wheel is positioned pointing in a substantially perpendicular direction to the driving wheel.

Each of the driven wheels can be pointing in a substantially fixed direction perpendicular to the driving wheel.

The driving wheel may be incrementally notched or recessed along its circumference to receive the driven wheels therearound.

The wheel set may include a complementary driving wheel with a predefined diameter being rotatably mounted on the wheel axle. The complementary driving wheel would be positioned adjacent and parallel to the driving wheel. A complementary set of driven wheels, each having a predefined diameter that is smaller than the diameter of the complementary driving wheel, is incrementally mounted along the circumference of the complementary driving wheel. Each complementary driven wheel is positioned pointing in a substantially perpendicular direction to the complementary driving wheel. In a further embodiment, the original driven wheels and complementary driven wheels can be offset from one another so that they do not contact during rotation of the driving wheel about the wheel axle. In another embodiment, each of the original driven wheels and complementary driven wheels can be pointing in a substantially fixed direction perpendicular to the original driving wheel and complementary driving wheel, respectively.

The original driving wheel and the complementary driving wheel may each be incrementally notched or recessed along its circumference to receive the original driven wheels and complementary driven wheels, respectively, therearound.

In a separate embodiment, the current invention is a system used by a human being to control a mobility apparatus. The system includes a remote controller that is remote to the mobility apparatus. An accelerometer is communicatively coupled to the remote controller, such that the accelerometer is integral with the person of the human being and is non-integral with the mobility apparatus. The system further includes a signal transmitter/receiver that is in communication with the motile functions of the mobility apparatus, where the signal transmitter/receiver is also in wireless communication with the remote controller. When the accelerometer is triggered by a movement of the human being, the accelerometer transmits a signal to the signal transmitter/receiver of the mobility apparatus through the remote controller. As a result of this signal being received by the signal transmitter/receiver, a resulting signal is transmitted to the motile functions of the mobility apparatus in order to transport the mobility apparatus in a direction that corresponds to the movement of the human being.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
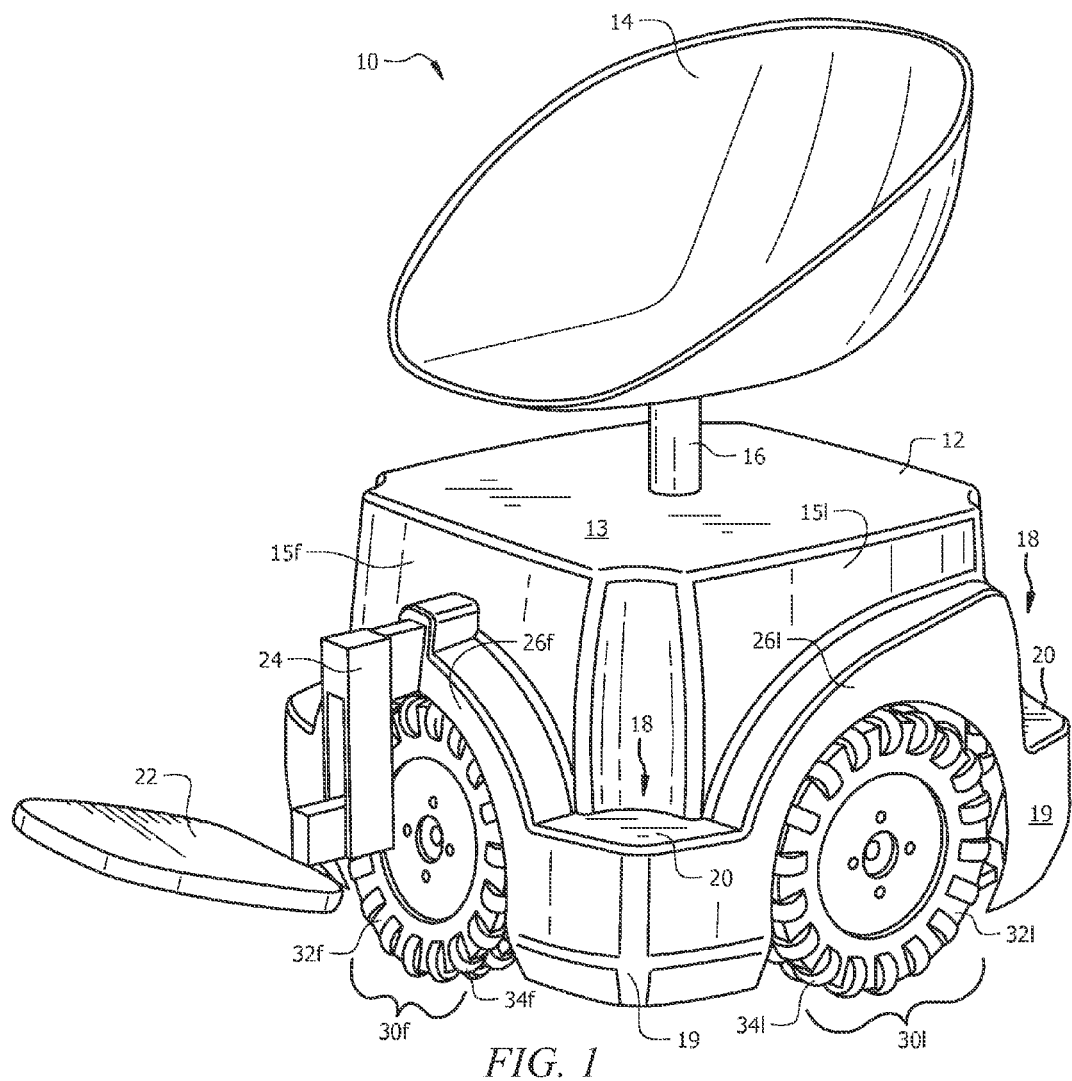
FIG. 1 is a perspective view of a wheelchair assembly according to an embodiment of the current invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

In an embodiment, the current invention is an omnidirectional, remote-controlled mobility apparatus, similar to a wheelchair, which allows the transport of an individual or object(s). The remote wireless control may be hand-held or may be attached to any part of the user's body (i.e., torso, arm, leg, head, etc.) or may be used by someone nearby due to its relatively small size. The user can either direct the motion of the device forward, back, side, diagonally, or turning right/left (i.e., rotation). The unit is height-adjustable based upon the needs of the user. The device is battery powered, and the remote control is connected via analog remote control, BLUETOOTH, Wi-Fi, etc.

Alternatively or in addition, the mobility apparatus can be controlled utilizing a software application on a smartphone or other mobile electronic device. The software application can include multi-directional arrows for moving the mobility apparatus in any direction. Alternatively, the software application can utilize the mobile device's accelerometer functions so that when the mobile device is tilted in a certain manner, the mobility apparatus is engaged and moves in a corresponding direction. In certain applications, the mobile device can be secured to a user of the mobility apparatus, so that when the user leans in a certain direction (i.e., the mobile device is tilted), the mobility apparatus moves in a corresponding direction. For example, when the mobile device is tilted forward, the mobility apparatus moves in a forward direction; when the mobile device is tilted backward, the mobility apparatus moves in a reverse direction; when the mobility apparatus is tilted to a side, the mobility apparatus moves in a corresponding sideways direction; when the mobility apparatus is tilted diagonally, the mobility apparatus moves in a corresponding diagonal direction. Optionally, if the mobile device detects a rotating tilt (i.e., clockwise or counterclockwise), the seat or chair on the mobility apparatus can rotate in a corresponding direction with the base rotating as well. Optionally, the seat or chair on the mobility apparatus can be manually locked/unlocked and/or manually rotate above the base without rotation of the base (i.e., without use of the tilt operation of the mobile device).

The truly omnidirectional capacity of the device and its innovative remote control mechanism creates a unique combination of movement and accessibility options for individuals and increases interactive possibilities. Applications of the current invention range widely, from daily living activities to dance or other forms of sport/recreation.

A benefit of the current invention is improvement of accessibility and quality of life for individuals with disabilities or limitations in mobility.

The omnidirectional control system may offer improved accessibility options for users, and their caregivers, and increases the capacity for integration with other people and the environment. This directly relates to improving the negative stigmas associated with disability in terms of equalizing opportunities for engagement in the activities of life. A user can maneuver easily in any direction, including diagonally and side to side. The remote control enables the user more freedom of motion when operating the device.

Rather than having a control system that is stationary and attached to the device, the current invention may include mobile control that can be used at a distance and/or may be placed anywhere on the user's body. For instance, when the remote control or mobile device is attached to the torso, this enables an individual to multi-task with their hands while transporting from place to place. The mobility apparatus has also been tested with the remote control or mobile device attached to the user's back and head with successful results, i.e., the mobility apparatus has moved in an accurate direction with the remote control or mobile device secured to these areas of the user's body.

In the context of a dance application, from which an embodiment of the current invention was conceived, there are limited choreographic possibilities with devices of the prior art. The current invention increases choreographic/expressive and interactive movement options. A greater range of spatial access and directional choice is enabled by this embodiment of the current invention through the omnidirectional control and versatility of attachment to the body. Prior art wheelchair assemblies require the wheelchair dancer to utilize a stationary hand control or manual wheel push control, and there are limits in directionality.

In daily living activities, enabling multiple integrated options for mobility is important as well. The device may also be adapted for different users' needs in terms of seating options, as many types of seats may be utilized and integrated into the current invention.

Another benefit of the current invention is the expansion of movement options for transport of people or objects.

Beyond its use for those individuals with mobility limitations, an embodiment of the current invention may be useful for any transport need, of people or objects, in which movement efficiency is needed or desired. The truly omnidirectional feature of this device enables movement possibilities not available in the existing prior art devices. Because the remote control can also be used by someone nearby, moving objects (or a person) from a distance is feasible.

The coupling of omnidirection with a remote control that is wearable or hand-held and can be operated by a person on or off the device, offers a significant amount of movement possibilities for users and those with whom they interact.

Example 1

In an embodiment, the omnidirectional remote-controlled mobility apparatus possesses the following integrated movement options: height change/adjustment and truly omnidirectional movement (i.e., forward, backward, diagonal, side-to-side, and right/left turning motion) controlled with a freely mobile remote that can be placed anywhere on the body or held by hand. The base of the unit is particularly compact and stable (non-tipping) with omni-wheels situated securely on four sides. Two safety switches on the device allow the user to quickly cut the power if needed. Any seat may be mounted to the single post mounting system, and may be easily removed for easy transport in a vehicle. Structures of conventional wheelchair assemblies are incapable of achieving such benefits.

The current invention supplies more choices than conventional mobility apparatuses for the user in terms of control options and directional choices.

An individual user has the choice of wearing the remote control (e.g., on wrist, torso, arm, head, etc.) and simply utilizing his/her own body to propel the device in the desired direction (i.e., front, side, back, diagonal, side-to-side, turning) or simply holding the remote control. This is particularly helpful in situations where a person may not be capable of effectively and efficiently operating the device themselves due to cognitive impairments, physical impairments, etc. The body-control option creates an ultimate freedom in multitasking activities, social interaction, etc. by freeing the hands. The individual user also has the option of adjusting the height of the seat/device to the desired level depending upon need or desire.

Additionally, the omnidirectional remote-controlled mobility apparatus could be ideal for use in performance venues (e.g., social dance/theatrical dance), recreation (e.g., basketball, tennis), daily activity, or therapy (e.g., physical rehabilitation).

In a dance context, from which the current device was conceived (e.g., mixed ability dance), the device is capable of being a true performance device, moving in an integrated fashion with the dancer's body and facilitating multiple movement possibilities, as well as possessing a fluid movement sensitivity, responding to both the dancer in the chair and the dancers interacting with it.

The current device possesses capabilities for the wheelchair dancer not enabled in conventional wheelchair/mobility apparatus designs that have limited directionality, static height, and limited control options.

Example 2

FIGS. 1-7 depict an embodiment of the current invention and the external structural aspects thereof. The base takes a general form as a cube or rectangular prism, contains four (4) similar-sized wheels in line with the vertical sides of the base, and has a top surface coupled to any chair known in the art. Chairs may be interchangeable as well atop a vertical chair stand. Thus, individuals may utilize different types of chairs for varying activities, for example a cushioned chair for watching a movie or a rigid chair for a sports activity. The chair may be coupled to the top surface of the base via any conventional or known means. Further, the chair may be adjusted for height as desired or needed by the user.

An adjustable footrest mechanism extends from the front side of the base and is capable of raising, lowering, rotating, or folding up as desired or needed by the user. The footrest itself or the footrest arm, which couples the footrest to the base, may be adjustable in this manner.

In this embodiment, each side of the base has a respective wheel well for placement of the wheels therewithin. Additionally, a notch or foot well is contiguous with the top surface of the base and indented vertically along each corner of the base. A footrest extends from a bottom portion of each corner of the base. Each footrest is contiguous with each respective foot well. Other grooves and notches may be disposed along the sidewalls of the base in order to facilitate the entry and exit of an individual onto and from the wheelchair assembly.

A large wheel set is disposed within each respective wheel well. Each large wheel set has a diameter that runs parallel to the side of the base within which it is disposed. Thus, as seen in FIG. 5, the wheels are not seen from the top, as they are contained within the walls of the base and are parallel to the walls (also see FIGS. 1-4 and 6). The wheel sets include a front wheel set, rear wheel set, left wheel set, and right wheel set. The left and right wheel sets are in diametric opposition to one another, and the left and right wheel sets are in diametric opposition to one another.

Figure 6:
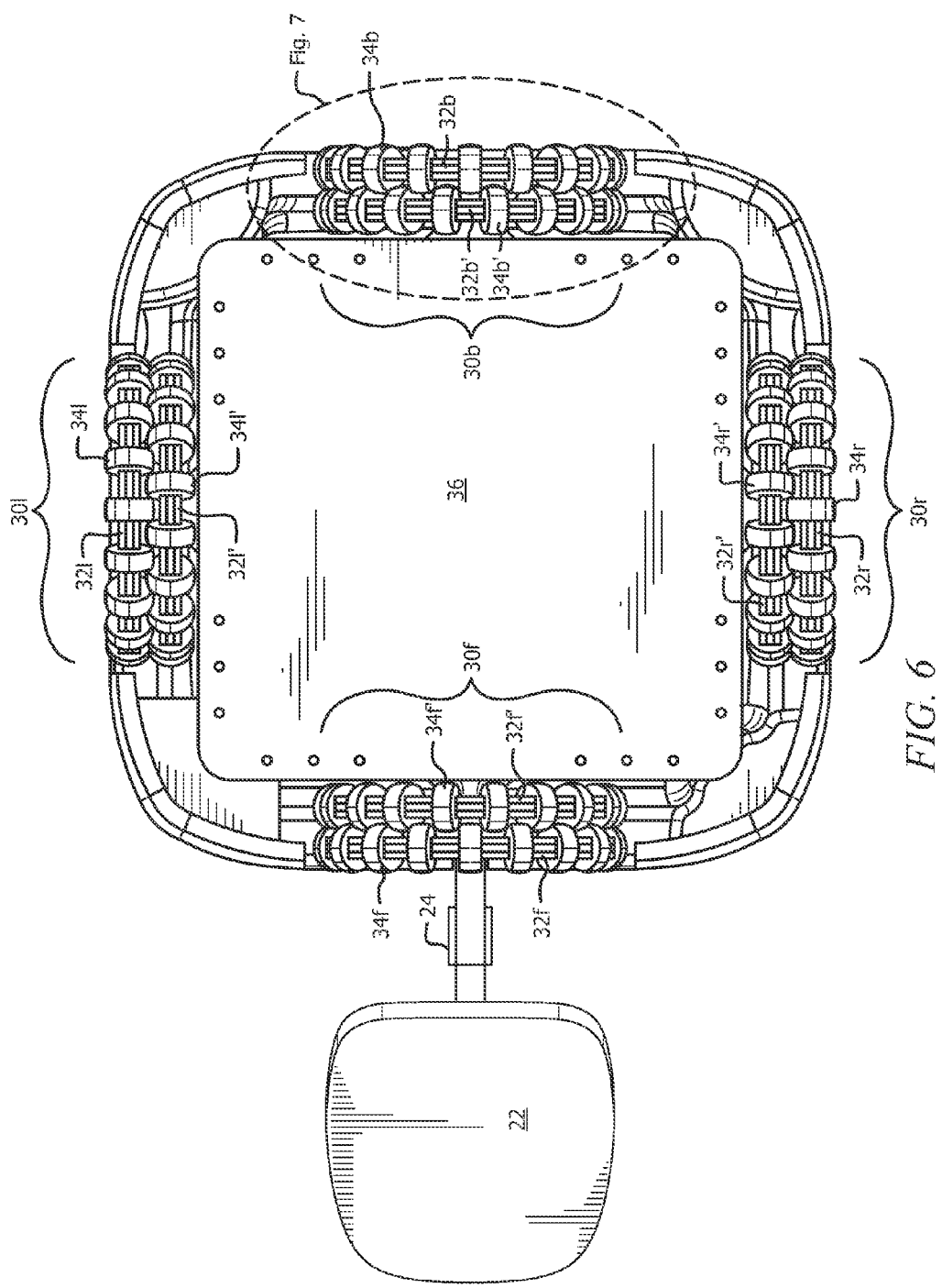
FIG. 6 is a bottom view of a wheelchair assembly according to an embodiment of the current invention.
Figure 7:
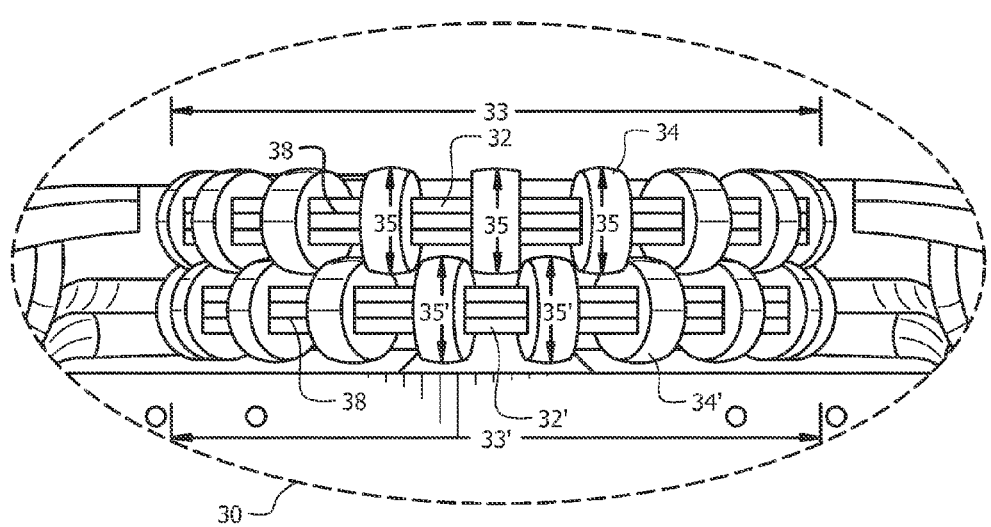
FIG. 7 is a close-up view of a wheel set of a wheelchair assembly according to an embodiment of the current invention.

Depicted in FIGS. 6 and 7, each large wheel set may include more than one (1) wheel adjacent to one another and having parallel diameters. This increases maneuverability of the wheelchair assembly, as activating one of the large wheels and also the small wheel set on the other large wheel (explained below) would allow a user to direct the motion of the wheelchair assembly in a diagonal direction.

As seen in FIG. 7, a large wheel set can include a plurality of smaller wheels (collectively described as a small wheel set) that have diameters transverse to the direction of flow of the larger wheel. In other words, a plurality of smaller wheels may be disposed around a large wheel. If two large wheels are present in a wheel, the smaller wheels may be offset around each wheel such that they do not overlap. The smaller wheels can serve not only as motorized and non-motorized wheels for transportation in the direction of their diameters, but also as grip support for transportation transverse to their diameters. A front set of smaller wheels are disposed around the front wheel set; a rear set of smaller wheels are disposed around the rear wheel set; a left set of smaller wheels are disposed around the left wheel set; and a right set of smaller wheels are disposed around the right wheel set In operation, the wheelchair assembly offers a user omnidirection, meaning the user may be transported in any direction at ease, along with rotation within a significantly smaller turning radius than seen in the conventional art. This is accomplished primarily through the use of a cubic-shaped base (or shaped as a rectangular prism), larger wheel sets, and smaller wheel sets, as described previously.

A user would enter the wheelchair assembly by utilizing the various foot wells, footrests, and other grooves and notches disposed on and within the base. Then the user would sit within the chair on top of the base and place his/her feet on the footrest if desired. Subsequently, by operating a remote control system either located on the user's body or as a handheld device, the user can move in any direction.

For example, during a direct forward motion, the left and right large wheel sets would rotate as indicated in a standard wheelchair assembly (the smaller wheels disposed on these sets may be used as grips for traction). However, the front and rear wheel sets would be unable to rotate because their diameters are perpendicular to the direction of motion. Thus, the smaller wheels incrementally disposed around the substantial entirety of the front and rear wheel sets would allow the wheelchair assembly to propel forward since the diameters of the smaller wheels are parallel to the direction of motion, such that they can rotate.

In another example, during a side-to-side motion, front and rear large wheel sets would rotate (the smaller wheels disposed on these sets may be used as grips for traction). However, the left and right wheel sets would be unable to rotate because their diameters are perpendicular to the direction of motion. Thus, the smaller wheels incrementally disposed around the substantial entirety of the left and right wheel sets would allow the wheelchair assembly to propel side-to-side since the diameters of the smaller wheels are parallel to the direction of motion, such that they can rotate.

Different combinations of activations of wheel sets and optionally smaller wheels would allow for easy movement in any direction, including forward, backward, side-to-side, diagonally, and turning and rotation.

A motor is disposed within the base and may be developed by a person of ordinary skill in the art to operate the current invention. The motor would be coupled to the large wheel sets and optionally coupled to the smaller wheel sets to activate or deactivate the wheel sets. Additionally, the motor can operate to adjust the height and position of the footrest and chair. The footrest may also be capable of folding into a compact position adjacent to the base. The chair may also be capable of rotation as needed or desired by the user.

Example 3

FIGS. 1-7 depict a mobility apparatus, generally denoted by the reference numeral 10, according to an embodiment of the current invention. Mobility apparatus 10 generally includes base 12 having a general shape of a cube or rectangular prism, though any feasible shape (e.g., spherical, ovular, trapezoidal, etc.) is envisioned, with a plurality of wheel sets 30 aligned with sides 15 of base 12, where each wheel set is perpendicular to an adjacent wheel set and is parallel to an opposing wheel set.

Base 12 includes top surface 13 with sitting element 14 connected in overlying relation thereof. Sitting element 13 can be fixedly attached directly or indirectly (via seat connector 16) to top surface 13 of base 12. Alternatively, sitting element 13 can be rotatably disposed in overlying relation to top surface 13 via seat connector 16. In this case, seat connector 16 would be electrically (and typically mechanically) coupled to the motor (not shown) disposed within the interior of base 12. Thus, sitting element 14 can rotate (with or without seat connector 16) without simultaneous rotation of base 12 (i.e., base 12 can remain stationary as sitting element 14 rotates). Sitting element 14 can also be manually locked so that it cannot freely rotate about base 12.

Base 12, in a cubic or rectangular conformation, further includes front side 15$f$, left side 15$l$, right side 15$r$, and rear side 15$b$. Front side 15$f$, left side 15$l$, right side 15$r$, and rear side 15$b$ can be individually referred to by their respective reference numerals or can be collectively referred to as sidewalls 15 that extend in a downward direction from top surface 13.

In an embodiment, the corners of base 12 where sidewalls 15 intersect include notches or foot wells 18 contiguous with top surface 13 of base 12. Foot wells 18 extend vertically from bottom portion 19 of the respective corner of base 12 to top surface 13. Step mechanism 20 extends from bottom portion 19 of each corner of base 12. Each step mechanism 20 is contiguous with each respective foot well 18 to facilitate entry and exit of a user of mobility apparatus 10. It can be appreciated that other grooves and notches may be disposed along sidewalls 15 of base 12 in order to facilitate the entry and exit of a user onto and from mobility apparatus 10.

In an embodiment, footrest 22 can extend from front side 15$f$ of base 12 for positioning of the user's feet thereon. Footrest 22 can be directly or indirectly attached to front side 15$f$. If indirectly attached, footrest connector 24 can be provided to connect front side 15$f$ to footrest 22. Footrest connector 24 may be electrically coupled to the motor (not shown) disposed within the interior of base 12, thus allowing footrest 22 to be raised, lowered, rotated, or folded up as desired by the user. Footrest 22 individually or in combination with footrest connector 24 can be adjustable in this manner.

Alternatively, a channel (not shown) can be formed around the perimeter of base 24, where the channel leads to the interior of base 24. In this case, the channel would be formed at a position where footrest connector 24 meets front side 15$f$. In this manner, footrest connector 24 can be electrically coupled to the motor (not shown) so that footrest 22 and footrest 24 can rotate around the perimeter of base 12 about its vertical central line of axis. This may be beneficial, for example, such that when sitting element 14 rotates around its vertical line of axis relative to base 12, footrest 22 travels with sitting element 12, so that during rotation of sitting element 14, the user can consistently position his/her feet on footrest 22.

Front side 15$f$ further includes front wheel well 26$f$ protruding at least partially therefrom; left side 15$l$ further includes left wheel well 26$l$ protruding at least partially therefrom; right side 15$r$ further includes right wheel well 26$r$ protruding at least partially therefrom; and rear side 15$b$ further includes rear wheel well 26$b$ protruding at least partially therefrom. Front wheel well 26$f$, left rear well 26$l$, right rear well 26$r$, and rear wheel well 25$b$ can be referred to individually by their respective reference numerals or can be referred to collectively as wheel wells 26.

Front wheel well 26$f$ is disposed in partial circumferential relation around front wheel set 30$f$ positioned therewithin; left wheel well 26$l$ is disposed in partial circumferential relation around left wheel set 30$l$ positioned therewithin; right wheel well 26$r$ is disposed in partial circumferential relation around right wheel set 30$r$ positioned therewithin; and rear wheel well 26$b$ is disposed in partial circumferential relation around rear wheel set 30$b$ positioned therewithin. Front wheel set 30$f$, left wheel set 30$l$, right wheel set 30$r$, and rear wheel set 30$b$ can be referred to individually by their respective reference numerals or can be referred to collectively as wheel sets 30.

Wheel sets 30 are secured (e.g., bolted 28) to base 12 using conventional means, such that wheel sets 30 cannot rotate outside of their path of travel, i.e., wheel sets 30 should remain fixed about their vertical axes with their diameters remaining within the same vertical plane.

Front wheel set 30$f$ includes large front wheel 32$f$ and a plurality of small front wheels 34$f$; left wheel set 30$l$ includes large left wheel 32$l$ and a plurality of small left wheels 34$l$; right wheel set 30$r$ includes large right wheel 32$r$ and a plurality of small right wheels 34$r$; and rear wheel set 30$b$ includes large rear wheel 32$b$ and a plurality of small rear wheels 34$b$. Large front wheel 32$f$, large left wheel 32$l$, large right wheel 32$r$, and large rear wheel 32$b$ can be referred to individually by their respective reference numerals or can be referred to collectively as large wheels 32. Small front wheels 32$f$, small left wheels 32$l$, small right wheels 32$r$, and small rear wheels 32$b$ can be referred to individually by their respective reference numerals or can be referred to collectively as small wheels 32.

Each wheel set 30, specifically each large wheel 32, is aligned with its respective sidewall 15, meaning large front wheel 32$f$ is aligned with and runs parallel to the plane of front side 15$f$, large left wheel 32$l$ is aligned with and runs parallel to the plane of left side 15$r$, large right wheel 32$r$ is aligned with and runs parallel to the plane of right side 15$r$, and large rear wheel 32$b$ is aligned with and runs parallel to the plane of rear side 15$b$. Thus, front wheel set 30$f$ and rear wheel set 30$b$ have diameters that are parallel to each other; similarly, left wheel set 30$l$ and right wheel set 30$r$ have diameters that are parallel to each other. Accordingly, front/rear wheel sets 30$f$, 30$b$ and left/right wheel sets 30$l$/30$r$ are disposed in perpendicular relation to one another.

Small wheels 34 are mounted around the circumference of each large wheel 32 and have a diameter that is perpendicular to the diameter of large wheel 32, respectively. Small wheels 34 can be passively connected and thus freely rotatable about their respective central axes, such that the rotation and direction of rotation of small wheels 34 is perpendicular to the rotation and direction of rotation of their respective large wheel 32.

Each small wheel 34 is spaced apart from adjacent small wheels along the circumference of large wheel 32, such that when mobility apparatus 10 is in use on the ground or other surface, large wheels 32 do not contact the ground or surface. Because large wheels 32 do not contact the ground or surface, each of large wheels 32 can function as a central axle with small wheels 34 radiating from the central axle, for example via radiating arms (not seen) or other means. In this case, a cover or other structure can be positioned in outer relation to the central axle in order to secure small wheels 34 from moving in an unwanted direction and to provide aesthetic value, such as that seen in the referenced figure as large wheels 32.

In an embodiment, seen in FIGS. 2-4 and 6-7, wheel sets 30 can each include more than one (1) (e.g., two) large wheel 32 having a substantially similar diameter and size with small wheels 34 circumferentially disposed on each large wheel 32 in each wheel set 30.

Figure 2:
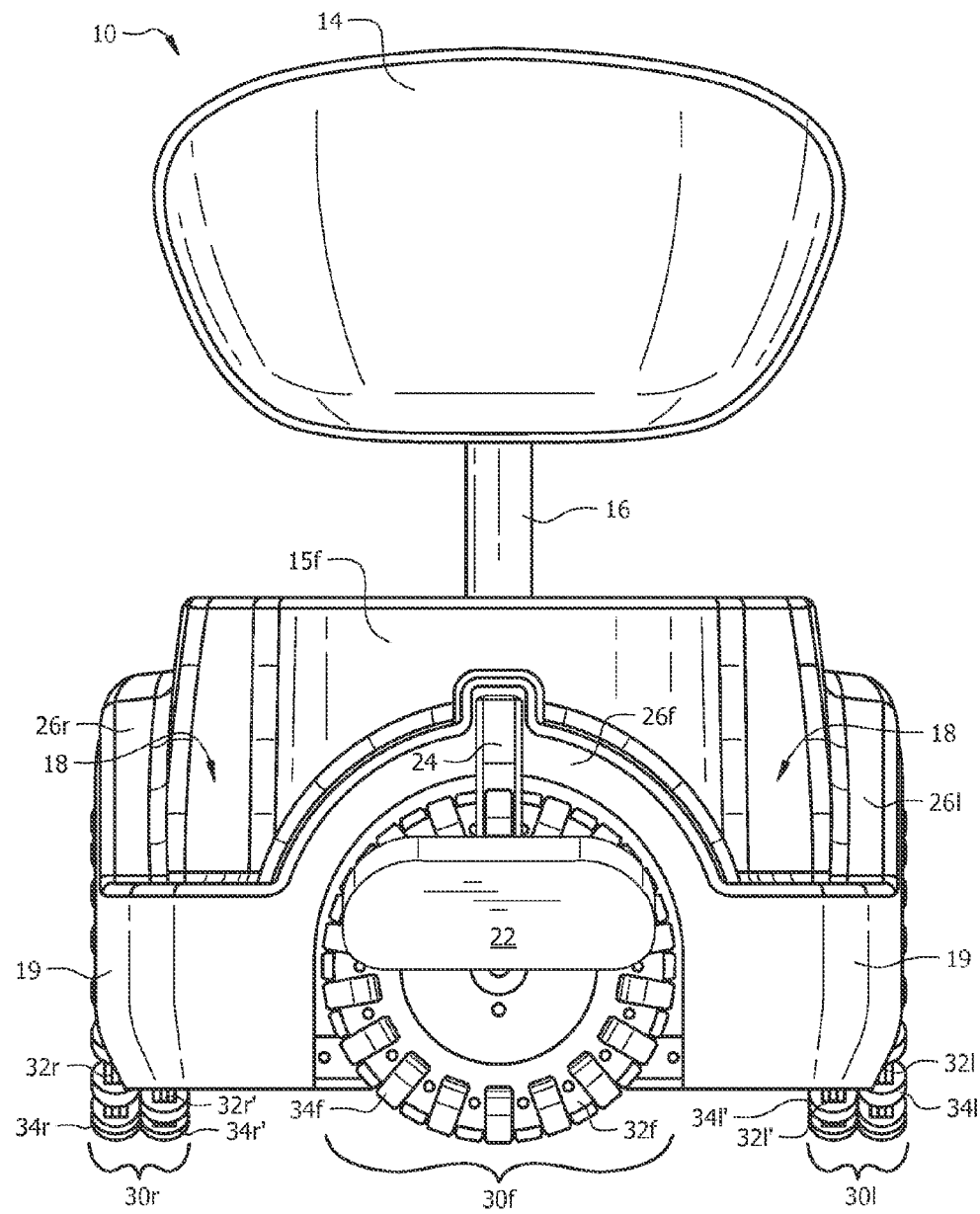
FIG. 2 is a front view of a wheelchair assembly according to an embodiment of the current invention.
Figure 3:
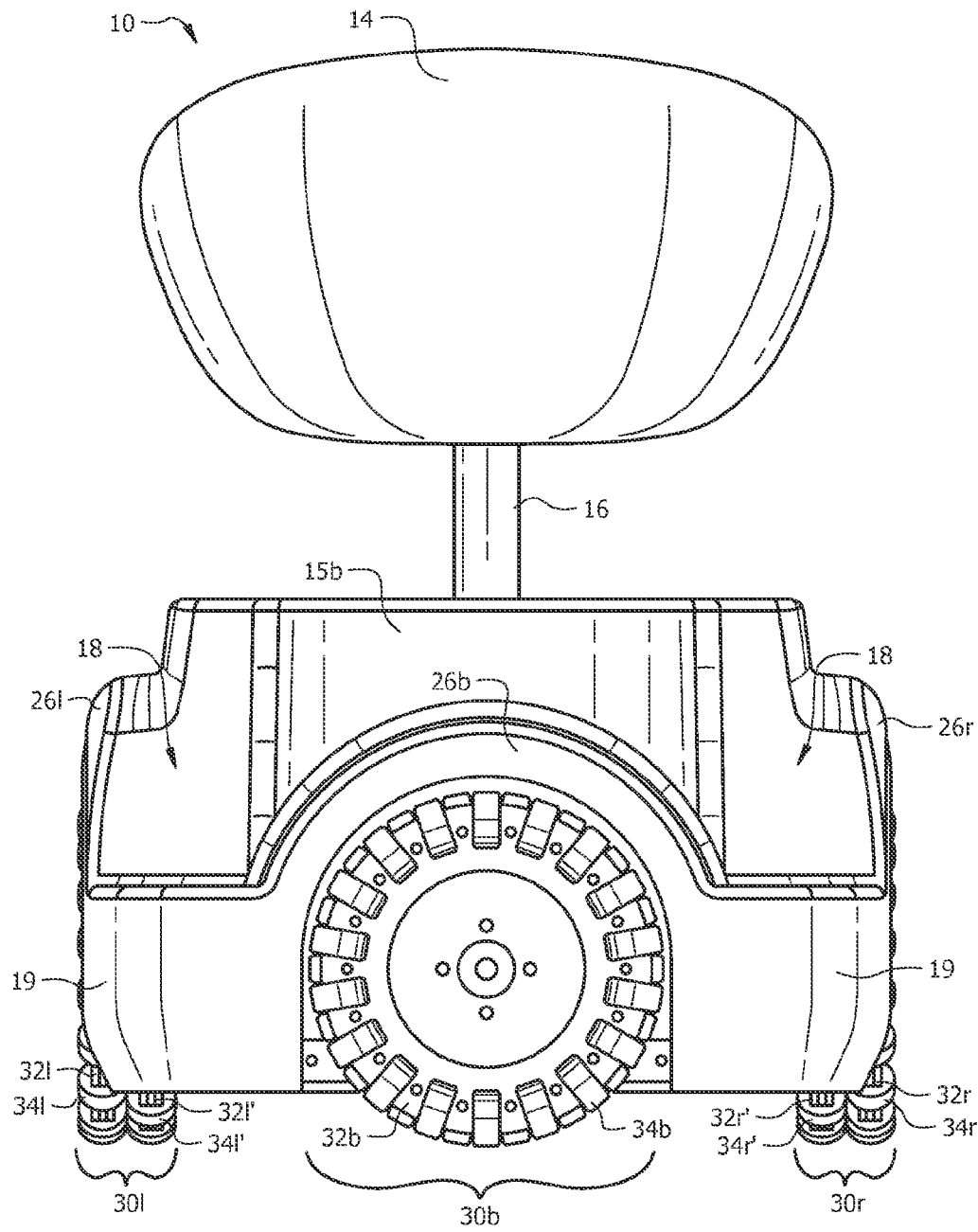
FIG. 3 is a rear view of a wheelchair assembly according to an embodiment of the current invention.

In this embodiment, as can be seen in FIGS. 2, 3, and 6, left wheel set 30*l* includes large wheel 32*l* with small wheels 34*l* disposed therearound and includes complementary large left wheel 32*l*' with complementary small left wheels 34*l*' disposed therearound. Complementary large wheel 32*l*' is positioned adjacent to large wheel 32*l* and has a diameter parallel to that of large wheel 32*l*.

Right wheel set 30*r* includes large wheel 32*r* with small wheels 34*r* disposed therearound and includes complementary large right wheel 32*r*' with complementary small right wheels 34*r*' disposed therearound. Complementary large wheel 32*r*' is positioned adjacent to large wheel 32*r* and has a diameter parallel to that of large wheel 32*r*.

Figure 4:
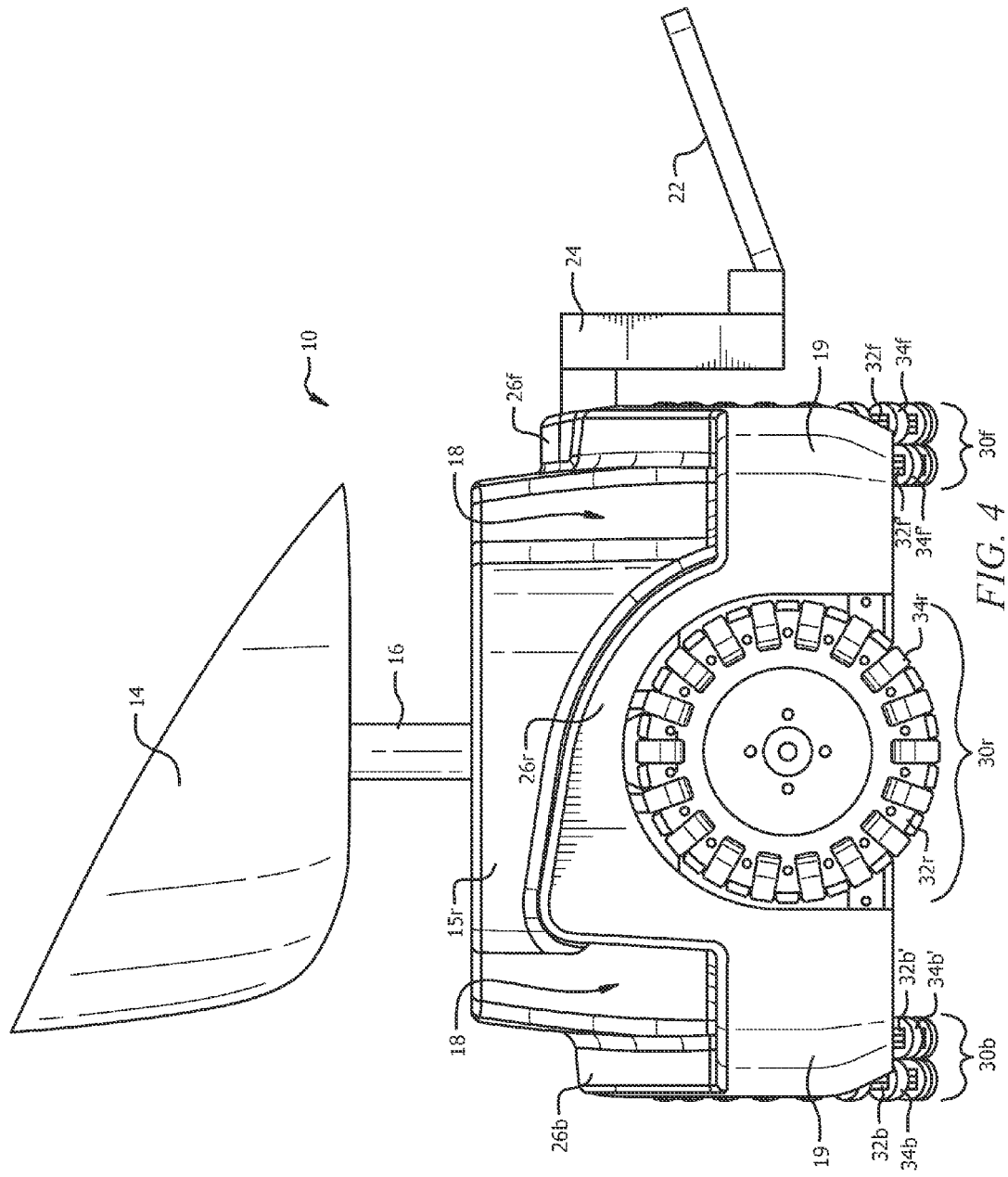
FIG. 4 is a side view of a wheelchair assembly according to an embodiment of the current invention.
Figure 5:
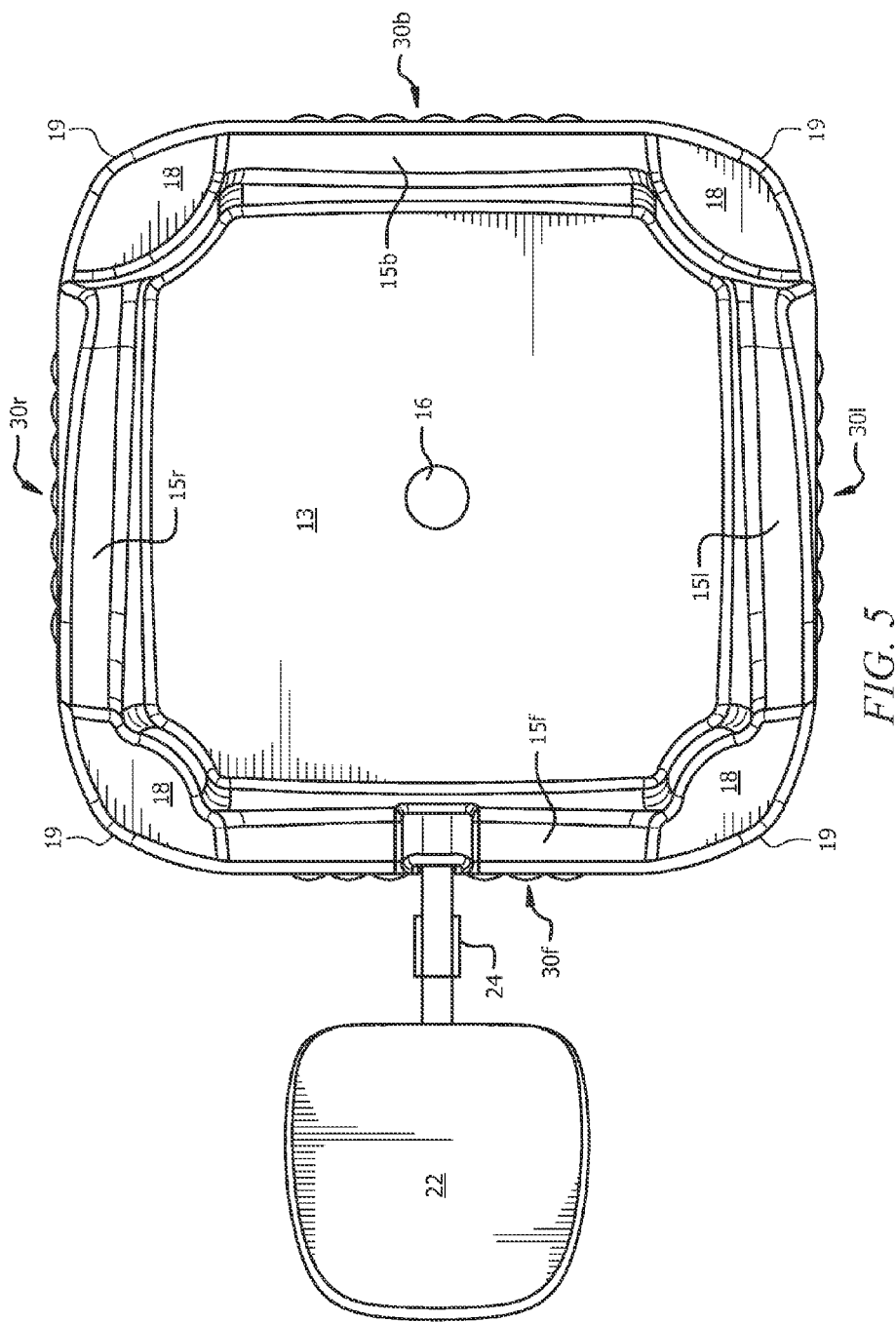
FIG. 5 is a top view of a wheelchair assembly according to an embodiment of the current invention.

As can be seen in FIGS. 4 and 6, front wheel set 30*f* includes large wheel 32*f* with small wheels 34*f* disposed therearound and includes complementary large front wheel 32*f*' with complementary small front wheels 34*f*' disposed therearound. Complementary large wheel 32*f* is positioned adjacent to large wheel 32*f* and has a diameter parallel to that of large wheel 32*f*.

Rear wheel set 30*b* includes large wheel 32*b* with small wheels 34*b* disposed therearound and includes complementary large rear wheel 32*b*' with complementary small rear wheels 34*b*' disposed therearound. Complementary large wheel 32*b*' is positioned adjacent to large wheel 32*b* and has a diameter parallel to that of large wheel 32*b*.

As can be seen in FIGS. 6 and 7, in the embodiments that include wheel sets 30 having large wheels 32, complementary large wheels 32', small wheels 34, and complementary small wheels 34', because large wheels 32 and complementary large wheels 32' are directly adjacent and parallel to one another, small wheels 34 and corresponding complementary small wheels 34' can be offset from one another, so that small wheels 34 and corresponding complementary small wheels 34' do not contact each other when mobility apparatus 10 is in use.

Optionally, large wheels 32 and/or complementary large wheels 32' can include ridges, ribs, or treads 38, as seen in FIG. 7, for securing small wheels 34 and/or complementary small wheels 34' in place or for control if/when contacting the ground.

In operation, a user enters mobility apparatus 10, optionally by utilizing step mechanism 20 and foot well 18 to facilitate entry, and comes to rest on sitting element 14. Footrest 22 can be positioned to allow the user to optionally rest his/her feet thereon. The user can then operate mobility apparatus 10 by utilizing any mechanism known in the art (e.g., joysticks or controllers on conventional power wheelchairs) or by utilizing a unique wireless system that will become clearer as this specification continues.

Mobility apparatus 10 is omni-directional, having capabilities of moving forward, in reverse, side-to-side, and diagonal, all without rotation of base 12 if desired. During a direct forward or backward/reverse movement, wheel sets 30*l* and 30*r* rotate in the direction of travel, i.e., large wheels 32*l* and 32*r* rotate about their central horizontal axes such that small wheels 34*l* and 34*r* do not rotate or do rotate minimally/ineffectually. During this direct forward movement, large wheels 32*f* and 32*b* are incapable of rotating in the direction of travel since their diameters are perpendicular to the path of travel. In this case, small wheels 34*f* and 34*b* rotate in the direction of travel, i.e., small wheels 34*f* and 34*b* rotate about their central horizontal axes (which are parallel to the central horizontal axes of large wheels 32*l* and 32*r*).

During a direct side-to-side (left or right) movement, wheel sets 30*l* and 30*r* rotate in the direction of travel, i.e., large wheels 32*f* and 32*b* rotate about their central horizontal axes such that small wheels 34*f* and 34*b* do not rotate or do rotate minimally/ineffectually. During this direct side-to-side movement, large wheels 32*l* and 32*r* are incapable of rotating in the direction of travel since their diameters are perpendicular to the path of travel. In this case, small wheels 34*l* and 34*r* rotate in the direction of travel, i.e., small wheels 34*l* and 34*r* rotate about their central horizontal axes (which are parallel to the central horizontal axes of large wheels 32*f* and 32*b*).

Different combinations of activations of wheel sets 30 and differing directions of rotation of wheel sets 30 would permit movement of mobility apparatus 10 in any diagonal direction, along with turning and rotation of mobility apparatus 10. For example, if it is desired that mobility apparatus is to be rotated in a counterclockwise direction, large rear wheel 32*b* would rotate in a clockwise direction (i.e., in the right direction) and large right wheel 32*r* would rotate in a clockwise direction (i.e., in the forward direction), thus allowing mobility apparatus 10 to rotate in a counterclockwise direction.

If large rear wheel 32*b* reverses direction and rotates in a counterclockwise direction (i.e., in the left direction) with large right wheel 32*r* continuing to rotate in a clockwise direction (i.e., in the forward direction), the mobility apparatus 10 could travel in a diagonal forward-left direction while overcoming any possible friction from front wheel set 30*f* and left wheel set 30*l*. A benefit of small wheels 34 being incrementally or spacedly disposed around the circumference of large wheel 32 is that at any given point, a minimal number of small wheels 34 are contacting the ground or surface on which mobility apparatus 10 is traveling. This smaller number of small wheels 34 reduces or minimizes the surface area of friction that must be overcome when traveling in any oblique or diagonal direction.

If, for example, large left wheel 32*l* were to be activated, albeit to a lower level than large rear wheel 32*b* and large right wheel 32*r*, then mobility apparatus 10 may travel in a steeper forward-left diagonal direction.

A substantially similar mechanism can be utilized to facilitate movement in any contemplated direction for mobility apparatus 10 by activating different wheel sets 30 at different levels.

Example 4

An embodiment of the current invention includes wheel set 30 as seen most clearly in FIGS. 6 and 7. Wheel set 30 includes large wheel 32 and an array of small wheels 34 incrementally disposed around the circumference of large wheel 32. Large wheel 32 has a diameter larger than each of small wheel 34; large wheel 32 also has a diameter along a first vertical plane, and small wheel 34 each have a diameter along a second vertical plane, where the first and second vertical planes are perpendicular to one another, meaning the diameter of large wheel 32 can be measured in one direction with the diameter of small wheel 34 measured in a perpendicular direction.

Small wheels 34 are mounted around the entirety of the circumference of large wheel 32, such that small wheels 34 have an outer edge that is outside of the outer edge of underlying large wheel 32. As such, it is typical that large wheel 32 would not contact the ground or surface on which it is traveling. The inner edges of small wheels 34 are positioned interior to the outer edge of large wheel 32. Accordingly, large wheel 32 may, for example, be spacedly notched or recessed about its circumference, wherein one or more small wheels 34 can be positioned within each notch or recess (not shown). Small wheels 34 are freely or mechanically rotatable within the notch or recess and thus rotate perpendicular to rotation of large wheel 32. Small wheels 34 should be fixed within large wheel 32 to the extent that small wheels 34 should not rotate about their axes radiating from the center of large wheel 32. In other words, small wheels 34 should only be able to rotate in their respective directions of travel.

It can be appreciated, however, that in alternative embodiments, small wheels 34 may be able to freely or limitedly rotate about their axes radiating from the center of large wheel 32. In certain situations, this may allow for greater range of motion of wheel set 30 when utilized with other wheel sets 30.

When wheel set 30 is traveling in the direction of rotation of large wheel 32, small wheels 34 typically would not rotate or would rotate minimally or ineffectually. Along the same lines, when wheel set 30 is traveling perpendicular to the direction of rotation of large wheel 32, small wheels 34 would rotate in the direction of travel, and large wheel 32 typically would not rotate or would rotate minimally or ineffectually.

It can be appreciated that wheel set 30 can be utilized in a range of devices that desire wheels capable of movement in multiple directions without non-directional rotation of the wheels (e.g., large wheel 32 does not rotate about its vertical axis; large wheel 32 remains fixed in that rotational direction and rotates only in the direction of travel).

Referring specifically to FIG. 7, wheel set 30 includes large wheel 32 with small wheels 34 disposed therearound and optionally can further include complementary large wheel 32' with complementary small wheels 34' disposed therearound. Complementary large wheel 32' is positioned adjacent to large wheel 32 and has a diameter parallel to that of large wheel 32. As such, large wheel 32 has a predetermined diameter denoted by the reference numeral 33, and small wheels 34 each have a predetermined diameter 35. Similarly, in this embodiment, complementary large wheel 32' has a predetermined diameter denoted by the reference numeral 33', and complementary small wheels 34' each have a predetermined diameter 35'

Example 5

Figure 8:
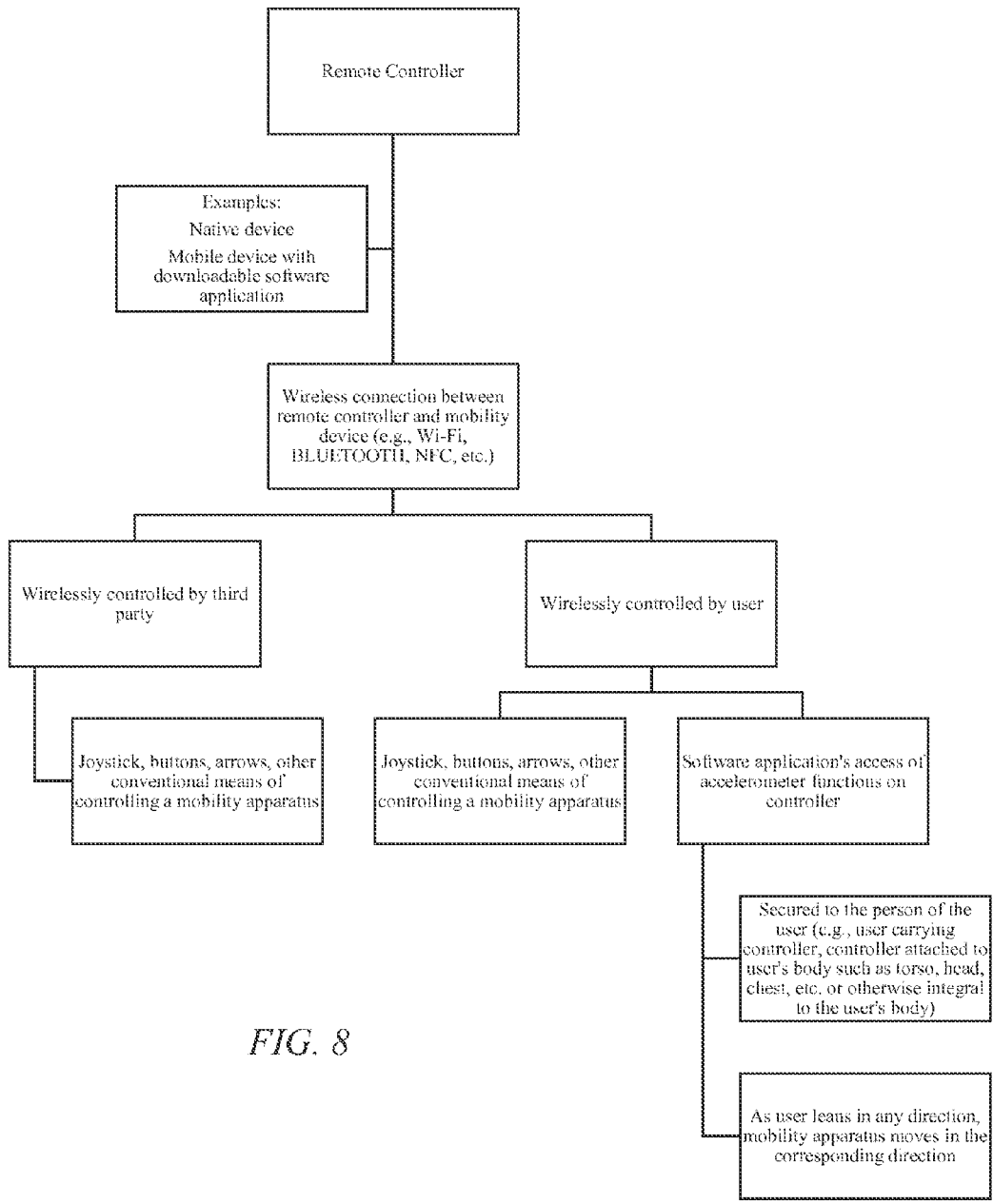
FIG. 8 is a flowchart depicting the methodology of a system, according to an embodiment of the current invention, that wirelessly controls a mobility apparatus.

FIG. 8 is a flowchart depicting the methodology of a system, according to an embodiment of the current invention, that wirelessly controls a mobility apparatus. The remote controller can take any form known in the art, for example a native device or a downloadable software application on a mobile device.

The mobility apparatus includes a signal transmitter and receiver that are in communication with the motor(s) contained within the mobility apparatus, such that when the signal receiver receives a transmission of data from a third party device/application, the signal transmitter/receiver relays the information to the motor(s), which responds accordingly by activating, deactivating, or otherwise controlling the wheels sets of the mobility apparatus.

Upon proper authentication, the remote controller is in wireless communication with the signal transmitter/receiver within the mobility apparatus. As such, when an action is taken on or received by the remote controller (e.g., directional input on the software application on the mobile device), the motor(s) react accordingly. The methodology or mechanism for wirelessly connecting the remote controller to the mobility apparatus can be accomplished in a variety of ways, as known in the art.

Upon successful connection between the remote controller and the mobility apparatus, the mobility apparatus can be wirelessly controlled by a user of the mobility apparatus or by a third party through use of the remote controller. If controlled by a third party, any conventional method of controlling the mobility apparatus is contemplated. Examples include, but are not limited to, a joystick, buttons, directional arrows, and other conventional means of controlling the underlying apparatus.

If the mobility apparatus is controlled by the user, not only can these same conventional methodologies apply (for controlling the apparatus), but the user can utilize the accelerometer within the remote controller. An example is provided herein using a smartphone that has installed a downloadable software application thereon. The software application has access to the accelerometer functions of the smartphone. Thus, if the smartphone is secured to the person of the user (e.g., attached to the body of the user using conventional means), when the user leans in any direction, a signal is sent from the smartphone to the signal receiver in the mobility apparatus. The signal transmitter/receiver relays the information to the motor(s) within the mobility apparatus, and the mobility apparatus subsequently travels in the corresponding direction.

It can be appreciated that a native device or other types of remote controllers can also include accelerometers—or devices that perform a substantially similar functionality as accelerometers—and be in wireless communication with the mobility apparatus.

Any suitable mobility apparatus can be used with the current system. Preferably, a mobility apparatus is used that has a wide range of motion without excess resistance in the directions of travel. Most preferably, the mobility apparatus described herein can be used with the current system because of its unique compact structure with omni-directional functionality.

Application

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

GLOSSARY OF CLAIM TERMS

Accelerometer: This term is used herein to refer to a component of a remote controller (or a native component in communication with a remote controller) that is capable of detecting and measuring vibrations and acceleration in a particular direction.

Central or wheel axle: This term is used herein to refer to a central shaft for a rotating wheel or structure having a wheel-type configuration, for example a plurality of structures that extend radially from the axle such that the totality of the plurality of structures has a wheel-type configuration at least with regards to movement of the underlying apparatus.

Complementary: This term is used herein to refer to a component that is related to another component, possibly to form a complete set, and can function in conjunction with the other component. For example, an outer wheel and a complementary adjacent inner wheel may form a complete wheel set, and each wheel can function together as the wheel set.

Diameter: This term is used herein to refer to a straight line between two end points on the circumference of a circle, where the straight line passes through the center of the circle. The diameter is measured or observed along the face of each side of a wheel in the direction or plane that the wheel is pointing. Thus, the diameter of one wheel can be perpendicular (or parallel) to the diameter of another wheel in certain positions when the former wheel is pointing in a direction that is perpendicular (or parallel) to the direction that the latter wheel is pointing.

Driven wheel: This term is used herein to refer to the "small wheel" in the foregoing specification. The driven wheels can be mounted along the circumference of a driving wheel or other extend radially from the central axle.

Driving wheel: This term is used herein to refer to the "large wheel" in the foregoing specification. The driven, or smaller, wheels can be mounted along the circumference of a driving wheel for increased stability or aesthetic purposes.

Extending radially: This term is used herein to refer to a pattern of structures (e.g., wheels) that are disposed at positions that radiate from a point (e.g. center axle).

Incrementally notched or recessed: This term is used herein to refer to a series of indentations or openings disposed along the circumference of a driving, or large, wheel for receiving the driven, or smaller, wheels positioned around the circumference of the driving, or large, wheel.

Integral: This term is used herein to refer to two (2) or more components (e.g., an electronic device and a human being) constituting a whole together. Thus, the two components function in unison or otherwise in conjunction with each other. An example of the two (2) components can be an electronic device (e.g., remote controller, accelerometer, etc.) and a human being who function in unison with each other or otherwise in conjunction with each other to transport the underlying mobility apparatus in a particular direction.

Non-integral: This term is used herein to refer to two (2) or more components (e.g., an electronic device and a mobility apparatus) being extrinsic or nonessential to the underlying function of each other. The components may have an effect on each other, for example triggering of an accelerometer causing movement of the underlying mobility apparatus, but the components do not make each other whole.

Offset: This term is used herein to refer to two component being disaligned in a particular manner.

Omnidirectional: This term is used herein to refer to the ability of an apparatus or device to move or transport in every direction without rotation of the apparatus or device itself. Thus, if the apparatus is pointing in a forward direction, for example, the apparatus can move forwards, backwards, side-to-side, and any diagonal direction without pointing away from that forward direction.

Passively mounted: This term is used herein to refer to a wheel being connected in a manner that it freely rotates about its respective axle, for example when rolling on the ground. In other words, the wheel is not actively activated by a motor or other powering means.

Person: This term is used herein to refer to the physical body of a human being (or other component in communication with the human being), such that the human being's input (e.g., movement) has a direct effect on the device or component that is secured to the person of the human being.

Plane: This term is used herein to refer to a real or imaginary flat surface that extends in each direction from an underlying surface or component. For example, if a vertical side the base of the current invention is rectangular, then a plane would extend in each direction of that vertical side. In another example, if a vertical side of the base of the current invention is rounded, then a plane would be tangential to the rounded side at its outermost position and would similarly extend in each direction as an imaginary flat surface that is tangential to that rounded side.

Remote controller: This term is used herein to refer to a device that is capable of wirelessly controlling a base unit, such as a mobility apparatus, based on the functional capabilities of that device. Examples of remote controllers include, but are not limited to, native electronic devices and smartphones with a downloadable software application installed thereupon.

Signal transmitter/receiver: This term is used herein to refer to an electronic device that generates and receives wireless signals to cause and effect a particular result. Any suitable signal transmitter/receiver can be utilized with the current invention.

Step mechanism and indented foot well: This term is used herein to refer to a means that facilitates a user's entry onto and exit from the mobility apparatus.

Substantially fixed direction: This term is used herein to refer to a position of a wheel in a direction such that the wheel does not rotate (or ineffectually rotates) about a vertical axis but rotates only about its axle, i.e., the wheel points and rotates in one direction only.

The advantages set forth above, and those made apparent from the foregoing disclosure, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An omnidirectional mobility apparatus, further comprising:
    a base having a front side, a rear side, a left side, a right side, and a top surface,
    said front side and said rear side opposing each other and having planes in parallel relation to each other, said left side and said right side opposing each other and having planes in parallel relation to each other, the planes of said front and rear sides being in perpendicular relation to the planes of said left and right sides, said top surface coupled to at least one of said front side, said rear side, said left side, and said right side;
    a front central axle positioned within or along said front side;
    a plurality of front wheels mounted on and extending radially from said front central axle, wherein the diameter of each of said plurality of front wheels is perpendicular to the plane of said front side;
    a rear central axle positioned within or along said rear side;
    a plurality of rear wheels mounted on and extending radially from said rear central axle, wherein the diameter of each of said plurality of rear wheels is perpendicular to the plane of said rear side;
    a left central axle positioned within or along said left side;
    a plurality of left wheels mounted on and extending radially from said left central axle, wherein the diameter of each of said plurality of left wheels is perpendicular to the plane of said left side;
    a right central axle positioned within or along said right side; and
    a plurality of right wheels mounted on and extending radially from said right central axle, wherein the diameter of each of said plurality of right wheels is perpendicular to the plane of said right side.

2. An omnidirectional mobility apparatus as in claim 1, further comprising:
    said each front wheel points in a substantially fixed direction perpendicular to the plane of said front side,
    said each rear wheel points in a substantially fixed direction perpendicular to the plane of said rear side and parallel to the diameter of said each front wheel in the substantially fixed position,
    said each left wheel points in a substantially fixed direction perpendicular to the plane of said left side and perpendicular to the diameters of said each front and rear wheels in the substantially fixed positions, and
    said each right wheel points in a substantially fixed direction perpendicular to the plane of said right side and parallel to the diameter of said each left wheel in the substantially fixed position.

3. An omnidirectional mobility apparatus as in claim 1, further comprising:
    a footrest extending from said front side.

4. An omnidirectional mobility apparatus as in claim 1, further comprising:
    a chair coupled to and disposed in overlying relation to said top surface.

5. An omnidirectional mobility apparatus as in claim 4, further comprising:
    said chair being rotatable about a vertical axis above said base.

6. An omnidirectional mobility apparatus as in claim 1, further comprising:
    said base having a generally cubic shape.

7. An omnidirectional mobility apparatus as in claim 1, further comprising:
    said plurality of front wheels, said plurality of rear wheels, said plurality of left wheels, and said plurality of right wheels each being passively mounted, such that said each plurality of wheels is non-motorized and freely rotatable in their respective directions of travel.

8. An omnidirectional mobility apparatus as in claim 1, further comprising:
    said front central axle including a front driving wheel with said plurality of front wheels mounted along the circumference of said front driving wheel,
    said rear central axle including a rear driving wheel with said plurality of rear wheels mounted along the circumference of said rear driving wheel,
    said left central axle including a left driving wheel with said plurality of left wheels mounted along the circumference of said left driving wheel, and
    said right central axle including a right driving wheel with said plurality of right wheels mounted along the circumference of said right driving wheel.

9. An omnidirectional mobility apparatus as in claim 8, further comprising:
    said front driving wheel being incrementally notched or recessed along its circumference to receive said plurality of front wheels,
    said rear driving wheel being incrementally notched or recessed along its circumference to receive said plurality of rear wheels, said left driving wheel being incrementally notched or recessed along its circumference to receive said plurality of left wheels, and said right driving wheel being incrementally notched or recessed along its circumference to receive said plurality of right wheels.

10. An omnidirectional mobility apparatus as in claim 1, further comprising:
a plurality of step mechanisms and indented foot wells along at least one of said front side, said rear side, said left side, and said right side to facilitate a user's entry onto said top surface of said mobility apparatus.

11. An omnidirectional mobility apparatus as in claim 1, further comprising:
a complementary plurality of front wheels mounted on and extending radially from said front central axle, said complementary plurality of front wheels being adjacent and parallel to said plurality of front wheels, wherein the diameter of each of said complementary plurality of front wheels is perpendicular to the plane of said front side, a complementary plurality of rear wheels mounted on and extending radially from said rear central axle, said complementary plurality of rear wheels being adjacent and parallel to said plurality of rear wheels, wherein the diameter of each of said complementary plurality of rear wheels is perpendicular to the plane of said rear side, a complementary plurality of left wheels mounted on and extending radially from said left central axle, said complementary plurality of left wheels being adjacent and parallel to said plurality of left wheels, wherein the diameter of each of said complementary plurality of left wheels is perpendicular to the plane of said left side, and a complementary plurality of right wheels mounted on and extending radially from said right central axle, said complementary plurality of right wheels being adjacent and parallel to said plurality of right wheels, wherein the diameter of each of said complementary plurality of right wheels is perpendicular to the plane of said right side.

12. An omnidirectional mobility apparatus as in claim 11, further comprising:
said plurality of front wheels and said complementary plurality of front wheels being offset from one another, such that said plurality of front wheels and said complementary plurality of front wheels do not contact each other when said mobility apparatus is in use, said plurality of rear wheels and said complementary plurality of rear wheels being offset from one another, such that said plurality of rear wheels and said complementary plurality of rear wheels do not contact each other when said mobility apparatus is in use, said plurality of left wheels and said complementary plurality of left wheels being offset from one another, such that said plurality of left wheels and said complementary plurality of left wheels do not contact each other when said mobility apparatus is in use, and said plurality of right wheels and said complementary plurality of right wheels being offset from one another, such that said plurality of right wheels and said complementary plurality of right wheels do not contact each other when said mobility apparatus is in use.

13. An omnidirectional mobility apparatus as in claim 11, further comprising:
said each complementary front wheel points in a substantially fixed direction perpendicular to the plane of said front side, said each complementary rear wheel points in a substantially fixed direction perpendicular to the plane of said rear side and parallel to the diameter of said each complementary front wheel in the substantially fixed position, said each complementary left wheel points in a substantially fixed direction perpendicular to the plane of said left side and perpendicular to the diameters of said each complementary front and rear wheels in the substantially fixed positions, and said each complementary right wheel points in a substantially fixed direction perpendicular to the plane of said right side and parallel to the diameter of said each complementary left wheel in the substantially fixed position.

14. An omnidirectional mobility apparatus as in claim 11, further comprising:
said front central axle including a front driving wheel with said plurality of front wheels mounted along the circumference of said front driving wheel, said front central axle further including a complementary front driving wheel with said complementary plurality of front wheels mounted along the circumference of said complementary front driving wheel, said rear central axle including a rear driving wheel with said plurality of rear wheels mounted along the circumference of said rear driving wheel, said rear central axle further including a complementary rear driving wheel with said complementary plurality of rear wheels mounted along the circumference of said complementary rear driving wheel, said left central axle including a left driving wheel with said plurality of left wheels mounted along the circumference of said left driving wheel, said left central axle further including a complementary left driving wheel with said complementary plurality of left wheels mounted along the circumference of said complementary left driving wheel, said right central axle including a right driving wheel with said plurality of right wheels mounted along the circumference of said right driving wheel, and said right central axle further including a complementary right driving wheel with said complementary plurality of right wheels mounted along the circumference of said complementary right driving wheel.

15. An omnidirectional mobility apparatus as in claim 14, further comprising:
said front driving wheel being incrementally notched or recessed along its circumference to receive said plurality of front wheels, said complementary front driving wheel being incrementally notched or recessed along its circumference to receive said complementary plurality of front wheels, said rear driving wheel being incrementally notched or recessed along its circumference to receive said plurality of rear wheels, said complementary rear driving wheel being incrementally notched or recessed along its circumference to receive said complementary plurality of rear wheels, said left driving wheel being incrementally notched or recessed along its circumference to receive said plurality of left wheels, said complementary left driving wheel being incrementally notched or recessed along its circumference to receive said complementary plurality of left wheels, said right driving wheel being incrementally notched or recessed along its circumference to receive said plurality of right wheels, and said complementary right driving wheel being incrementally notched or recessed along its circumference to receive said complementary plurality of right wheels.

16. A system for controlling a mobility apparatus by a user, comprising:

a remote controller that is remote to said mobility apparatus;

an accelerometer communicatively coupled to said remote controller, such that said accelerometer is integral in communication with said user and is non-integral with said mobility apparatus; and a signal transmitter/receiver that is in communication with motile functions of said mobility apparatus, said signal transmitter/receiver being in wireless communication with said remote controller;

wherein when said accelerometer is triggered by a movement of said user, said accelerometer transmits a signal to said signal transmitter/receiver of said mobility apparatus through said remote controller, wherein as a result of said signal being received by said signal transmitter/receiver, said signal transmitter/receiver transmitting a resulting signal to said motile functions of said mobility apparatus in order to transport said mobility apparatus in a direction that corresponds to said movement of said user.

* * * * *

UNITED STATES PATENT AND TRADEMARK OFFICE
CERTIFICATE OF CORRECTION

PATENT NO. : 9,027,678 B1  
APPLICATION NO. : 14/213011  
DATED : May 12, 2015  
INVENTOR(S) : Morris et al.

Page 1 of 1

It is certified that error appears in the above-identified patent and that said Letters Patent is hereby corrected as shown below:

On the title page item (71), should read

(71) Applicants: Merry Lynn Morris, Tampa, FL (US);
Mark Rumsey, Murrieta, CA (US);
Thomas Messerschmidt, Riverside, CA (US);
Tim John Lewis, Garden Grove, CA (US);
Neil Edmonston, Pensacola, FL (US)

On the title page item (72), should read

(72) Inventors: Merry Lynn Morris, Tampa, FL (US);
Mark Rumsey, Murrieta, CA (US);
Thomas Messerschmidt, Riverside, CA (US);
Tim John Lewis, Garden Grove, CA (US);
Neil Edmonston, Pensacola, FL (US)

Signed and Sealed this
First Day of March, 2016

Michelle K. Lee
*Director of the United States Patent and Trademark Office*